July 3, 1962

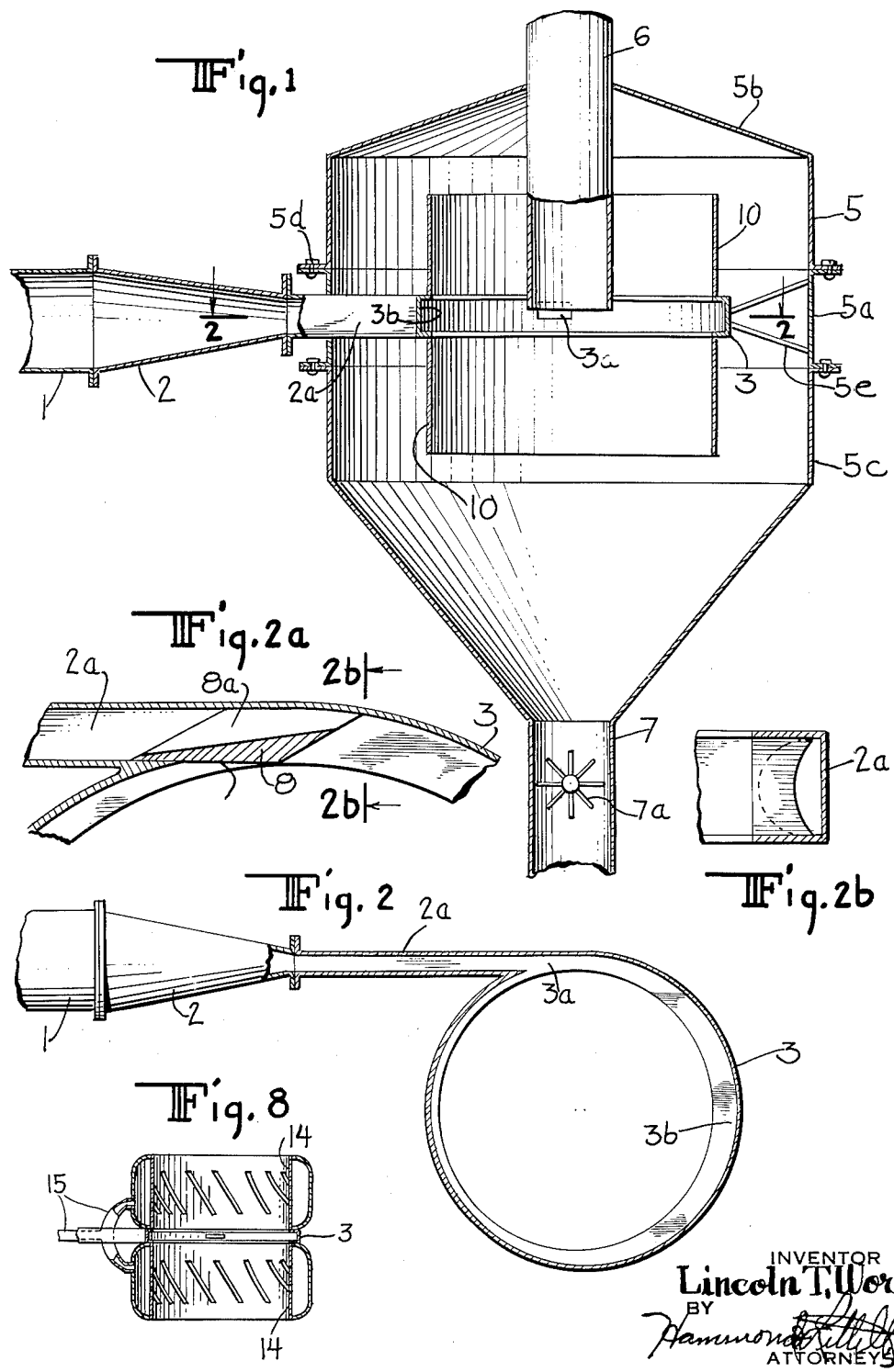

L. T. WORK 3,042,202

CYCLONE CLASSIFIER

Filed July 3, 1958

INVENTOR
Lincoln T. Work
BY
ATTORNEYS

United States Patent Office 3,042,202
Patented July 3, 1962

3,042,202
CYCLONE CLASSIFIER
Lincoln T. Work, 36 W. 44th St., Maplewood, N.J.
Filed July 3, 1958, Ser. No. 746,431
11 Claims. (Cl. 209—144)

This invention relates to a method and apparatus for collecting fine particles from gaseous streams and for classifying the particles. The invention more particularly relates to a cyclone type of dust collector and classifier.

Collectors of the cyclone type are generally composed of an outer shell with an upper cylindrical section and with a lower section resembling an inverted cone, with an inlet in the side of the cylinder near the top, and an outlet leading from the top of the cylinder. Gaseous streams containing fine particles enter the inlet in a tangential direction and whirl around the interior wall. The path of the stream is a double vortex, spiraling downward along the interior wall and upward in the center of the collector towards the outlet. The particles are thrown outwardly by centrifugal force toward the outer wall. As the particles lose velocity, they fall to the bottom of the collector. The gaseous stream passes out of the collector through the outlet at the top. Such collectors are described and illustrated in the Chemical Engineer's Handbook, John H. Perry, third edition, McGraw-Hill Book Company, New York, beginning on page 1023.

Prior art collectors have been effective to a certain extent. However, the prior art collectors have not been able to obtain complete separation of particles from the gas stream. Nor has it been possible to obtain sharp classification within desired ranges of size particles. This is due to the fact that the ordinary cyclone has an area above the inlet in which they are eddy currents and wall drag which permits or forces oversize particles to travel inward to a point where the converging air stream at the classifier outlet can carry them away, either as losses in the exit gas stream of a collector or as oversize in the fine fraction of a classifier.

The micronizer is also a classifier as well as a grinding device. (This device is illustrated on page 1045 of the Chemical Engineer's Handbook.) However, it fails to obtain complete separation and sharp classification on account of static wall drag and from the fact that it has no suitable oversize removal or collector action in the grinding chamber. Its collector is not a sharp classifier.

It is an object of my invention to provide an improved structure of the cyclone type having no moving parts for collecting fine particles of aerosols (solid or liquid) from a gaseous or vapor stream.

Another object is to provide a particle collector which is effective to collect finer sizes than the cyclones now employed.

Another object is to provide a classifier in which classification is essentially free of the leakage and stray flow by which oversize particles get into fine products and solid particles are entrained in the exit gases as in prior art classifiers and collectors.

A further object is to provide a classifier whereby classification can be effected in the range from a few microns up into sieve sizes, but very closely to any one size as determined from design details and conditions of operation.

Another object is to provide a classifier wherein classification is subjected to a radial washing action with particle free air while the suspension of particles is generally traveling in a circular path peripherally within the classifier chamber and also being displaced outwardly or along the cylinder wall while being washed, the net effect being the reduction of fines in the oversize.

These and other objects of my invention will become apparent as the description thereof proceeds.

Various attempts have been made to overcome the difficulties of the prior art cyclonic separators and classifiers. Bypass arrangements have been added to cyclone separators to catch particles from the eddy currents and return them to the main gas stream. In addition, collectors have been used in series to effect a more complete separation of particles from the gaseous stream. Centrifugal separators have been used to reduce the static wall drag. However, none of these methods have obtained the results gotten by the use of the methods and apparatus herein described.

In applying the principles of my invention, a high energy stream of solid (or liquid) and gas is caused to rotate in a circular channel spaced inwardly from the walls of the collector to cause a gathering of the coarse particles at the periphery of said inwardly spaced spiral. The finer particles may also be gathered with the coarser particles in a collector, or taken out with the gaseous stream in a classifier. Symmetrical cylindrical walls located inwardly from the walls of the collector are placed perpendicular to the plane of rotation of the gas stream, and at the high energy value of rotation, particles move both up and down equally, since the force of gravity is of no effect at this high velocity. This differs from the prior art wherein particles are only taken off from the vertical stream in a downward direction.

My invention comprises the use of steps which are described generally as follows:

(1) Establishment of a rotating suspension of particles in gas or vapor by forcing or inducing a stream of particle conveying gaseous fluid to flow tangentially or spirally inside a circular chamber and spaced from the walls of the collector or classifier.

(2) Causing the suspension layer to assume smooth rotational flow inside the periphery of the chamber by having an inwardly smaller concentric cylinder wall to baffle stray particles in disturbed flow in the circular plane of feed.

(3) Arranging for the displacement of gas and solid to move the rotating suspension layer upwardly and downwardly along the inner cylinder walls essentially equally in both directions.

(4) In collection, allowing the cleaned gases to move inwardly inside the end of the central inner cylinder while the suspension layer continues to the ends of the cylinder tube for discharge into a collecting and removal chamber outside said cylinder which is sealed against uncontrolled ingress or egress of air or vapor. (Alternatively the inwardly displaced gases may be caused to reverse their rotation and exhaust themselves through a reverse Venetian blind structure on their way to the outlet.)

(5) In classification, the established rotating suspension layer is displaced upwardly and downwardly in both directions within a cylinder spaced from the walls of the collector, which inner cylinder is not solid but has perforations, slots or a screen like porous wall structure through which a particle free gaseous fluid is admitted at the periphery of the rotating suspension layer to wash it of fines.

The gaseous fluid in the feed plus the added gaseous fluid containing the washed out fines may then flow inwardly to the inlet pipe for removal, while the oversize is discharged at the ends of the cylinder inside the classifier and collected as before. For fine sizes a cut may be made using a reverse Venetian blind as the criterion of admission to the outlet; this is normally employed only when the separation based on rotational velocity and the inward movement of gaseous fluid will not produce an adequately fine separation.

The apparatus used to practice the method above outlined comprises an external cone housing with top center outlet and closed cone bottom from which the collected solids are withdrawn by means of a rotary or other valve. The outer cone housing has an interchangeable ring insert through which all inlet lines pass. The inner cylinder is supported from the interchangeable ring insert whereby inner cylinder structures of different diameter and height may be readily inserted in an outer cyclone housing of a given size to effect different particle size classification or separation.

The particulate feed line by which the particle laden gases are fed into the collector, feeds into an involute vortex ring supported inside and spaced inwardly from the collector walls so as to set up a rotational vortex inside and spaced from the collector walls and the cylindrical extensions of this involute ring provide the height necessary to effect the desired classification before the solid particles pass over or under the walls of the inner cylinder. The cylindrical extensions of the involute particle feed ring may be rolled in at the ends or tapered inward or outward depending upon the classification conditions desired. This construction causes the suspension layer created in the involute ring to spread upwardly and downwardly in either direction from the plane of rotation of the involute channel with only a limited diminution of its rotational velocity. Due to the manner of displacement, the air stream moves inwardly while the solids remain in a suspension layer which spirals away from the feed involute and finally discharges over the ends of these cylindrical extensions of the involute feed ring.

The rotational flow of the particle laden gases will be established rather smoothly shortly after these spirals leave the involute structure, but in the involute there may be a degree of turbulence which might permit some coarse particles to get to the outlet pipe and be carried out of the collector in the gas stream. The cylindrical shield structures are provided to prevent this.

When the apparatus is used for classification, the classifier structure is like the collector except that the cylindrical sections which are attached to the involute may contain thin slots or perforations or may be made of porous metal and a housing encloses and backs up either the slots or the perforated ring and the housing is fed by a separate flow of particulate free air or vapor controlled in relation to the amount of feed fluid passing in. This clean fluid passes through the whirling layer of particulates and washes the fine particles inwardly to a zone of removal where they will be swept out of the collector while the coarser particles which have been washed quite free of the fines by this secondary fluid will pour off the ends of the inner cylinders into the cyclone chamber.

The invention will be better understood by reference to the drawings which illustrate a preferred embodiment of the invention and several modifications thereof and in which, FIG. 1 illustrates a cross-sectional view in elevation of the collector apparatus.

FIG. 2 illustrates a cross-sectional top view of the internal involute ring in the collector taken substantially on the line 2—2 of FIG. 1.

FIG. 2a shows details of the involute ring feed and FIG. 2b is a section along the line 2b—2b of FIG. 2a.

Figure 3:
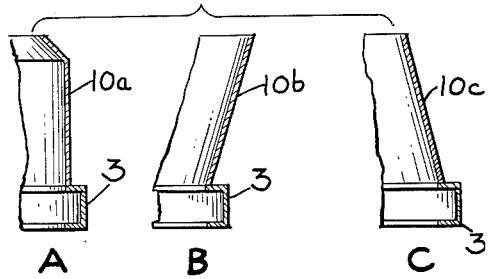

FIG. 3, parts A, B and C, illustrates various modifications in the cylindrical attachments to the involute ring.

Figure 4:
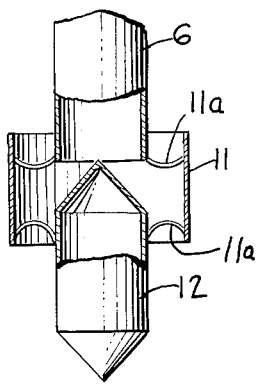
Figure 5:
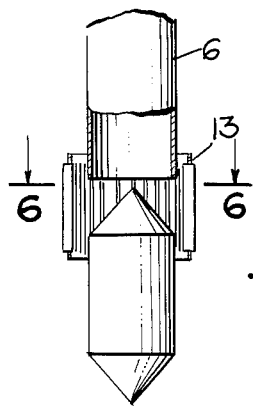
Figure 6:
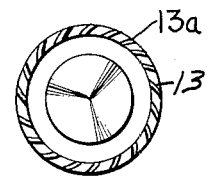

FIGS. 4, 5 and 6 illustrate the baffling means at the outlet for the gaseous stream.

Figure 7:
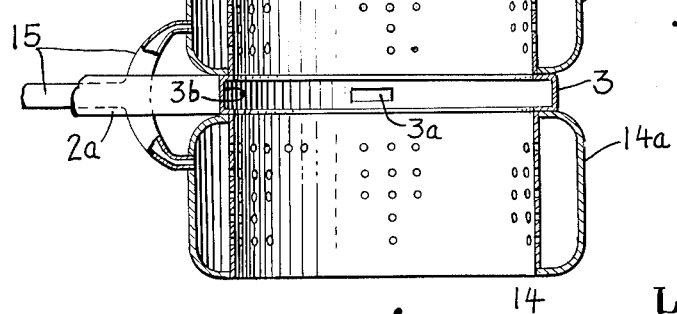

FIGS. 7 and 8 illustrate the air inlets for the washing section of the apparatus when used as a classifier.

In the embodiment illustrated the collector comprises the outer shell or cone housing 5 having upper and lower sections 5b and 5c and a removable center section 5a removably secured to sections 5b and 5c by bolts 5d as illustrated. Inlet duct 1 with an adapter 2 leads into the removable center section 5a of the housing 5 to converge the particulate laden fluid stream to a narrower area and hence a higher velocity. Adapter 2 is connected to duct 2a which passes into a circular ring 3 supported inside the center section 5a of the housing 5 by a plurality of supports 5e welded respectively to the walls of the center section 5a and the ring 3. The use of a removable center section 5a supporting the involute ring 3 and the feed duct 2a permits the use of standard parts 5b and 5c while allowing for removability and interchanging of sections 5a carrying different diameter involute rings 3 and different cylinders thereon. This permits the creation of a flexible structure which can be manufactured partially by mass production methods and assembled for individual needs. An outlet 6 is provided at the top of the cone housing 5 which may terminate within the plane of the involute ring 3 or may terminate above or below the ring 3. At the bottom of housing 5 is the collecting area 5c which passes to a discharge conduit 7 for the collected solids. A star valve 7a prevents ingress or egress of gases through the conduit 7.

The coupling 2a which leads the feed line into the removable center section 5a continues until it discharges into open ring 3 which is preferably a recessed channel structure 3b as illustrated in FIG. 1 which diminishes in channel depth from the point of entrance until the ring closes again at the same point as illustrated in FIG. 2.

The key to good collection is the velocity of this stream coming in through 2a and discharging into the ring 3. The opening 3a into ring 3 can be reduced in size by any convenient method so as to make a narrow or wide slot radially. The opening 3a may be initially machined into ring 3 to provide a radial rectangular slot as illustrated in FIG. 1 of the largest size desired and if a smaller opening is required for a particular classifier condition a removable insert 8, as illustrated in FIG. 2a, may be inserted in the opening 3 to restrict the size thereof. As illustrated in FIG. 2a approximately one half of opening 3a has been closed by insert 8 leaving a triangular shaped opening 8a; however, larger or smaller openings can be provided by insert 8.

Figure 2C:
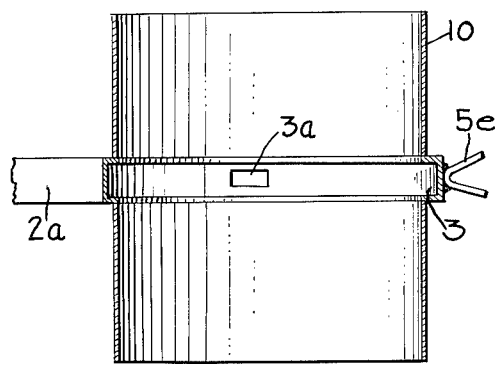
FIG. 2c illustrates one form of cylindrical attachments for the involute ring.

Cylindrical sections 10 are preferably secured to the involute channel ring 3 above and below the channel section as illustrated in FIGS. 1 and 2c. Sections 10 may be in the form of a regular cylinder or curbed cylindrical form 10a wherein the outer ends of the cylinder are bent inward as in FIG. 3A or in a frustro-conical form sloping outwardly or inwardly as illustrated at 10b and 10c in FIGS. 3B and 3C. The ends of sections 10, 10a, 10b or 10c may be provided with dam or curb as desired. All of the different tubular sections 10 may be made interchangeable and removably secured to ring 3, but like sections should be used above and below ring 3.

The high energy gas stream being spread around the periphery of ring 3 flows upwardly and downwardly on the symmetric rings 10 and discharges into the cone housing 5 from the outer ends of these rings so that there is a completely symmetrical pattern around the high energy gas plane which rotating gas plane is located inwardly from the walls of the housing 5 by the distance the ring 3 is spaced from the housing walls. It is important to prevent solid particles coming into the disturbed area of ring 3 from bouncing inwardly and thus being drawn into outlet 6 and discharged in the outlet gases and it is also important in maintaining the symmetry that the lower portion of the ring sections 10 have a symmetric center to correspond with outlet 6.

FIGS. 4, 5 and 6 illustrate various modifications of shields for outlet opening 6. In FIG. 4 a cylindrical shield 11 surrounds and is supported from the bottom of outlet 6 by a plurality of welded supporting bars 11a and a conically ended cylinder 12 of smaller diameter than the outlet 6 is mounted in the inlet of outlet 6. The shields 11 and 12 thereby prevent direct entrance of solid particles in the rotating gas stream set up in the involute ring 3 from entering the outlet 6 and only permit eddy currents of gas free of solid particles larger than desired from entering the outlet 6. FIGS. 5 and 6 illustrate the use of a shield 13 having curved vanes 13a similar to a Venetian blind around the circumference thereof to shield the entrance into outlet 6. The vanes 13 are preferably sloped in the direction of rotation of the gas stream in ring 3 so that the gas stream must reverse itself in order to pass between the vanes 13a and enter the outlet 6. The vanes 13a should be so shaped as to minimize disturbance of the rotating gas stream due to eddies.

In order to improve the operation of the apparatus as a classifier, ring 10 of FIG. 2c is replaced by a perforate ring 14, as illustrated in FIGS. 7 and 8, which is either a slotted ring (as in FIG. 8) or a screen ring (as in FIG. 7) so constructed as to have essentially smooth circular inner surface. Whether a slotted, perforated or screen ring 14 is used the construction of the upper and lower ring should be the same. The screen ring may be of pressed powdered metal or it may be the type of screen made by rolling together screen cloth and sintering it into a porous but strong and essentially solid ring. Outwardly of perforate ring 14 radially is a solid housing 14a which can be structurally bonded to the screen or slotted ring 14, such as by welding. Housing 14a is fed by ducts 15 which will enter the removable cone housing section 5a just behind the duct 2a. In the operation of this embodiment of the invention the particle laden fluid enters 2a and 3 and sets up rotation of high energy and the suspension flows upwardly and downwardly from 3 over the perforate rings 14 and the heavy particles gather against the rings 14 and the light particles float more freely somewhat inwardly of the perforated rings 14. An added impressed stream of particle free fluid is passed tangentially from ducts 15 into chambers 14a and passes inwardly through the perforations in rings 14 to displace a portion of the rotating stream spiraling around the inner surface of rings 14 thereby washing the coarse layer and sweeping fine suspension layer near the surface inwardly to the area where it will be picked up for discharge into the shield ring 11 or the reverse Venetian blinds 13 and into the outlet 6. By careful control of rotational velocities through the use of insert 8 and ring 3 and the volume of washing fluid entering from chambers 14a a sharp size control can be effected whereby substantially all of the particles of finer than a definite size will pass into the discharge outlet 6 to be collected as fine product while coarse particles above this controlling size will pass off the end of rings 14 into cone housing 5 for collection.

The entire inner surface of rings 14 need not be perforated as it is sufficient if a narrow slot or a few rows of perforations are provided adjacent the ends of rings 14 from which the heavier particles escape into the space between the ring 14 and the outer walls 5 of the classifier or collector. By washing the layer of coarser particles on rings 14 with particle free fluid just before the coarser particles pass over the top or bottom of rings 14 the layer of coarse particles is freed from finer particles therein and a sharper classification is secured.

It can be seen that all the working structure in the collector and in the classifier which may need to be changed to give a different performance is secured to the involute ring 3 and supported from the removable section 5a of the housing. Accordingly outer housing sections 5b and 5c may be flanged as illustrated so that the section 5a and the inner structure supported thereby can be made interchangeable for specific needs. The dummy cone 12 and the short concentric cylinder 11 or the Venetian blinds 13 are structurally fastened to the outlet pipe. As the collector and classifier has no moving parts it is very economical to build and maintain as compared to structures using high speed mechanical devices to effect classification. Since parts are interchangeable, repair, maintenance and cleaning is simple.

While I have described certain preferred embodiments of my invention, it will be understood that the invention is not limited thereto. Various changes and modifications may be made without departing from the spirit of the disclosure and the scope of the appended claims.

I claim:

1. An apparatus for removing fine particles from particulate laden gaseous streams which comprises an outer shell, inlet means for passing a gaseous stream into said shell, an involute race tangentially attached to said inlet means having a diameter less than that of the shell, tubular means extending substantially equally upwardly and downwardly from said involute race and concentric therewith, gas outlet means extending from the upper part of said shell and opening at said race, and particle outlet means in the lower part of said shell.

2. An apparatus for removing fine particles from particulate laden gaseous streams which comprises an outer shell, inlet means for passing a gaseous stream into said shell, an involute race tangentially attached to said inlet means having a diameter less than that of the shell, means in said inlet for increasing the velocity of said gaseous stream, tubular means extending substantially equally upwardly and downwardly from said involute race, gas outlet conduit means extending from the upper part of said shell along the central axis of said tubular means and opening at said race, a dummy structure corresponding to said outlet conduit spaced apart from said opening and extending downwardly along said axis, baffle means within said race and surrounding said gas outlet opening, and particle outlet means in the lower part of said shell.

3. An apparatus for classification of fine particles from particulate laden gaseous streams which comprises an outer shell, inlet means for passing a gaseous stream into said shell, an involute race tangentially attached to said inlet means having a diameter less than that of said shell, perforate tubular means extending substantially equally upwardly and downwardly from said involute race, means for passing gaseous streams through said perforate tubular means, gas outlet means extending from the upper part of said shell and opening at said race, and particle outlet means in the lower part of said shell.

4. An apparatus for classification of fine particles from particulate laden gaseous streams which comprises an outer shell, inlet means for passing a gaseous stream into said shell, an involute race tangentially attached to said inlet means having a diameter less than that of the shell, perforate tubular means extending substantially equally above and below said involute race, means communicating with said perforate tubular means for passing gaseous streams therethrough, gas outlet conduit means extending from the upper part of said shell and opening near the center of said race, baffle means within said race and surrounding said gas outlet opening, and particle outlet means in the lower part of said shell.

5. As an article of manufacture, an element of a particle collector which comprises a segment of a cylindrical shell, inlet conduit means connected to and opening into said shell, an involute channel member located inside said shell and tangentially connecting with said inlet means, said involute member having a diameter less than that of said shell, and tubular members extending substantially equally upwardly and downwardly from said involute member.

6. As an article of manufacture, an element of a particle collector which comprises a segment of a cylindrical shell, tangential inlet conduit means connected to and opening into said shell, an involute channel member located inside said shell and tangentially connecting with said inlet means, said involute member having a diameter less than that of said shell, and perforate tubular members extending substantially equally upwardly and downwardly from said involute member and concentric therewith.

7. As an article of manufacture, an element of a particle classifier which comprises a segment of a cylindrical shell, inlet conduit means connected to and opening into said shell, an involute channel member located inside said shell and tangentially connecting with said inlet means, said involute having a diameter less than that of said shell, and perforate tubular members extending substantially equally upwardly and downwardly from said involute member and concentric therewith, and means communicating with said tubular members for passing a gaseous fluid through said perforate tubular members.

8. The method of separating solid particles from a particle laden gas in a particle collector which comprises feeding said gas through a restricted opening to set up a high speed rotating cylindrical gas stream spaced inwardly from the walls of said particle collector, confining the outward spread of said rotating gas stream to within the diameter of said cylindrical stream until the particles have reached a given point substantially symmetrically above and below the point at which the gas is fed into said cylindrical gas stream, and then discharging said particles outwardly toward the collector walls while permitting the particle free gas to pass out of said collector through a central outlet located inside said rotating cylindrical gas stream.

9. The method of separating particles from a particulate laden gas stream which comprises forming a rotating cylindrical layer of the particles and fluid spaced inwardly from the walls of a collector, feeding the particulate laden stream tangentially into said cylindrical layer substantially at a midpoint of the cylindrical layer, permitting particles to leave said cylindrical layer at its ends and pass outwardly toward the walls of the collector, and withdrawing particle free gaseous fluid upward from the center of said cylindrical layer.

10. The method of separating particles from a particulate laden gaseous stream in a collector which comprises the steps of passing a high energy stream of particle laden gaseous fluid tangentially into a cylindrical vessel spaced inwardly from the walls of said collector, passing said fluid into an involute path, of smaller diameter than that of said collector, whereby the particles are segregated from said gaseous fluid and move upwardly and downwardly equally, forming said particles into substantially symmetrical cylindrical layers above and below said involute path and concentric therewith, permitting particles to separate from said cylindrical layers and to pass outwardly from said layers at the ends away from said involute path, permitting said separated particles to drop to the lower part of said collector, and withdrawing the particle free gaseous fluid upwardly from the center of said cylindrical layers.

11. The method of classifying particles in a particulate laden stream which comprises forming a rotating cylindrical layer of the particles and fluid, feeding the particulate laden stream into said cylindrical layer substantially at a midpoint, passing particle free gaseous fluid washing streams through said cylindrical layers to separate finer particles leaving the coarser particles in said rotating cylindrical layer, permitting said coarser particles to leave said cylindrical layer at its ends, and withdrawing a suspension of finer particles in the gaseous fluid upward from the center of said cylindrical layer.

References Cited in the file of this patent

UNITED STATES PATENTS

| | | |
|---|---|---|
| 526,334 | Volm | Sept. 18, 1894 |
| 970,530 | Miller | Sept. 20, 1910 |
| 1,753,490 | Whitmore | Apr. 8, 1930 |
| 2,301,371 | Corwin | Nov. 10, 1942 |
| 2,829,771 | Dahlstrom | Apr. 8, 1958 |

FOREIGN PATENTS

| | | |
|---|---|---|
| 115,545 | Australia | July 14, 1942 |
| 254,790 | Switzerland | Jan. 3, 1949 |
| 645,135 | Great Britain | Oct. 25, 1950 |
| 794,789 | Great Britain | May 7, 1958 |

UNITED STATES PATENT OFFICE
CERTIFICATE OF CORRECTION

Patent No. 3,042,202　　　　　　　　　　　　　　July 3, 1962

Lincoln T. Work

It is hereby certified that error appears in the above numbered patent requiring correction and that the said Letters Patent should read as corrected below.

Column 2, line 27, for "vertical" read -- vortical --.

Signed and sealed this 6th day of November 1962.

(SEAL)
Attest:

ERNEST W. SWIDER
Attesting Officer

DAVID L. LADD
Commissioner of Patents